Feb. 4, 1941.  F. BOINOT  2,230,318
PROCESS FOR CARRYING OUT INDUSTRIAL ALCOHOLIC FERMENTATIONS
Filed June 2, 1937
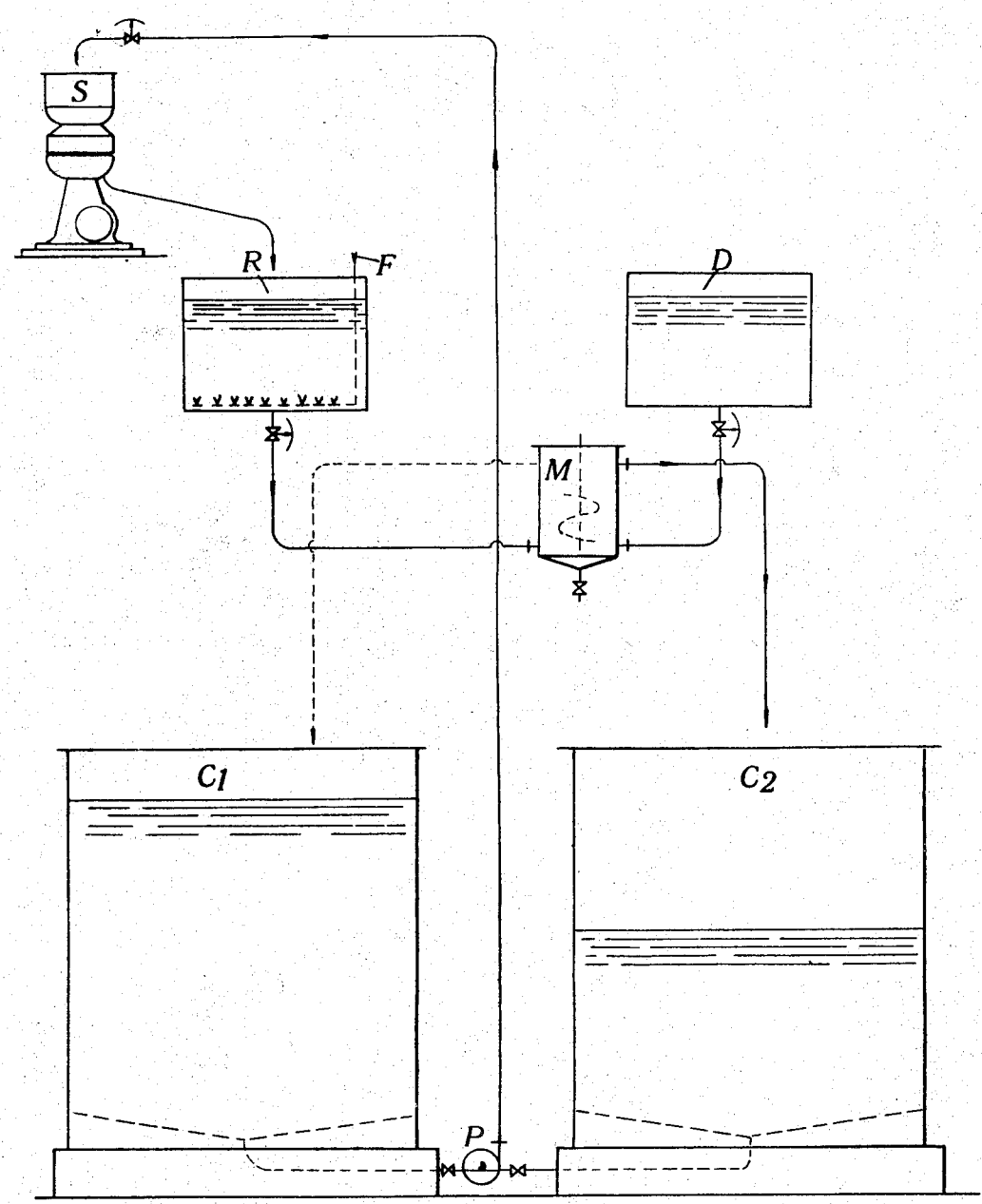
INVENTOR
Firmin Boinot
BY
C. F. Wendroth
ATTORNEY Patented Feb. 4, 1941

2,230,318

UNITED STATES PATENT OFFICE 2,230,318

PROCESS FOR CARRYING OUT INDUSTRIAL ALCOHOLIC FERMENTATIONS

Firmin Boinot, Melle, Deux-Sevres, France, assignor to Les Usines De Melle, Melle, Deux-Sevres, France, a company of France Application June 2, 1937, Serial No. 146,070
In France June 8, 1936

7 Claims. (Cl. 195—37)

It is known that industrial alcoholic fermentations are hindered and frequently stopped by bacterial infection.

A very efficacious method of remedying this interference with the fermentation process is to subject the liquid to sterilization prior to fermentation, but this method is hardly ever employed because it sometimes involves technical complications and, in addition, is generally expensive.

In the majority of cases, the protection of industrial fermentations against infection is effected merely by the employment of antiseptics.

It is known that soluble fluorides and mineral acids are at present employed for this purpose. Either of these antiseptic agents may be employed alone or they may be used together.

The proportions of these agents have to be suitably regulated in order that the antiseptic action should not be too great—i. e., should not interfere with the alcoholic ferments themselves.

Moreover, the antiseptic dose, which is adjusted to the activity of the yeast for the purpose of obtaining a good alcoholic fermentation, is not always sufficient for preventing or stopping the development of certain bacteria. This insufficiency of prevention is particularly noticeable with the employment of mineral acids.

It is known that the antiseptic action of mineral acids is principally due to the hydrogen-ion concentration which is brought about by their dissociation in the media to which they are added.

The dissociation of mineral acids is high in pure water, but it is not always so in the sugar solutions that are subjected to alcoholic fermentation, which are generally buffered to a great extent. For this reason, the dissociation of the acid is checked and the hydrogen-ion concentration often becomes too small with the proportions of acid ordinarily employed.

Consequently, in the case of many fermentations, in order to obtain a hydrogen-ion concentration which is capable of exerting a certain antiseptic action on the bacterial infection, it is necessary to employ such quantities of acid that the total acidity hinders the alcoholic ferments; the activity of the fermentation then slackens, the yeast cells progressively die and the alcoholic fermentation slows down and may even stop entirely.

The present invention consists, in principle, in subjecting the yeast that is necessary for the fermentation for at least four hours to the action of a hydrogen ion concentration at least ten times as great as that to which it is subjected during the rest of the fermentation period.

It is possible to carry out this treatment of limited duration in the course of the alcoholic fermentation in the vat by restricting the time of action of the acid to a fraction of the entire duration of the operation. This restriction of time may be effected, for example, by neutralizing the acid.

However, according to a preferred method of carrying out the invention, the treatment of the yeast to render the bacteria inactive is effected outside the fermentation vat. This preferred method of carrying out the invention avoids the treatment of the yeast in a large bulk of fermentation liquid and, consequently, diminishes the quantity of acid to be employed. The yeast may be taken from a vat and be treated and returned to the same vat or it may be returned to an alternative vat. The yeast may be treated just as it is or it may be diluted in four to five times its volume of water and, for the purpose of increasing the vitality of the cells, it can be given a certain quantity of fermentable sugar during the course of the acid treatment. The quantity of fermentable sugar added may be such that the quantity of alcohol resulting therefrom does not exceed 1% by weight in the mass.

The excess hydrogen ion concentration mentioned above is produced by using a concentration of acid which is 5 to 10 times as much as that to which the yeast is subjected during the rest of the fermentation period. The total amount of acid used, however, is not excessive if the yeast is treated outside the fermentation vat as indicated above and may in fact be no greater than that amount of acid which is generally used in fermentation processes.

This effect of rendering the bacteria inactive and of preserving the yeast is increased within wide limits if the action of $CO_2$ is added to that of the acid and the great hydrogen-ion concentration. The $CO_2$ is introduced into the liquid by bubbling it in under atmospheric pressure or at an excess pressure of at least 100 gms. per sq. cm. It has been found in fact, that the bacteria are much more sensitive to the action of the high hydrogen-ion concentration when the latter is exerted in an atmosphere of $CO_2$, whilst the yeast withstands it perfectly well.

The following examples when read in conjunction with the accompanying drawing which illustrates preferred arrangement of apparatus in a diagrammatic manner, will make it clear how the present invention is carried out.

Example 1

Molasses wort of hydrogen-ion concentration of $1\times10^{-5}$ (i. e. pH=5) contained in the vat C' after fermentation is forced by a pump P into the yeast separator S.

The liquid, deprived of yeast, passes from the separator to a distillation stage, whilst the yeast itself is collected in the reaction tank R where, either diluted with cold water or not, it is subjected for a limited time, 15 hours for example, to the action of a hydrogen-ion concentration of $1\times10^{-3}$ (i. e., pH=3) and to the action of $CO_2$, which is supplied through a pipe F. Fermentable sugar may be added to the liquid in this tank.

After this treatment, the yeast is passed to the mixer M where it is incorporated in molasses ready for fermentation coming from a vessel D where it has previously been diluted to the desired limit, but not acidified.

The mixture leaving M then passes into a vat $C_2$ which is associated for alternative use with the vat $C_1$ and in which the alcoholic fermentation takes place.

When the fermentation has been finished in the vat $C_2$ the wort is passed in the manner described above into the separator S for the purpose of producing treated yeast for a new fermentation in the vat $C_1$ which is now empty and is fed from the mixer M in the same manner as $C_2$ was fed. This cycle of operations may be repeated as often as desired.

Example 2

In this case beet wort of hydrogen-ion concentration $1\times10^{-3}$ (i. e. pH=3), contained in the vat C' after fermentation is forced into the yeast separator S.

The liquid, deprived of yeast, passes from the separator S to a distillation stage, whilst the yeast itself is collected in the reaction tank R where, either diluted with water or not, it is subjected for a limited time, 4 hours for example, to the action of a hydrogen-ion concentration of $1\times10^{-2}$ (pH=2) and to the action of $CO_2$, after the addition, if desired, of fermentable sugar.

After having undergone this treatment, the yeast is passed to the mixer M where it is incorporated with beet wort coming from vessel D.

The mixture is then passed into the vat $C_2$ where it ferments.

When the fermentation has finished in vat $C_2$ the cycle of operations is repeated as described in Example 1 to produce a new fermentation in the vat $C_1$.

It is obvious that the invention described is not limited to the two examples above described, and it is quite evident that any method may be employed for subjecting the yeast from a given fermentation temporarily to the action of a high hydrogen-ion concentration, and also that any means may be employed for subjecting it to the action of $CO_2$.

What I claim is:

1. A continuous cyclic process for the production of alcohol by fermentation by means of yeast comprising repeatedly carrying out the cycle of operations which consists of subjecting a sugar-containing wort to the action of yeast, allowing the fermentation of said wort to proceed to completion, separating said yeast from the fermented wort thus produced, subjecting said yeast, for at least 4 hours, to the action of a hydrogen ion concentration at least 10 times as great as that to which it is subjected during said fermentation and mixing said yeast with a further quantity of sugar-containing wort.

2. A continuous cyclic process of production of alcohol by fermentation by means of yeast, comprising repeatedly carrying out the cycle of operations which consists of subjecting a sugar-containing wort to the action of yeast, allowing the fermentation of said wort to proceed to completion, separating said yeast from the fermented wort thus formed, diluting said separated yeast with from 4 to 5 times its volume of water, subjecting said yeast thus diluted, for at least 4 hours, to the action of a hydrogen ion concentration at least 10 times as great as that to which it is subjected during the said fermentation and mixing said yeast with a further supply of sugar-containing wort.

3. A continuous cyclic process for the production of alcohol by fermentation by means of yeast, comprising repeatedly carrying out the cycle of operations which consists of subjecting a sugar-containing wort to the action of yeast, allowing fermentation of said wort to proceed to completion, separating said yeast from the fermented wort thus formed, diluting said yeast with from 4 to 5 times its own volume of water and then subjecting said yeast, for a period of at least 4 hours, to the simultaneous action of a hydrogen ion concentration at least 10 times as great as that to which it is subjected during said fermentation, and of carbon dioxide, and mixing said yeast with a further quantity of sugar-containing wort.

4. The continuous cyclic process of producing alcohol by fermentation by means of yeast, comprising repeatedly carrying out the cycle of operations which consists of subjecting a sugar-containing wort to the action of yeast, allowing fermentation of said wort to proceed to completion, separating said yeast from the fermented wort thus formed, subjecting said yeast for at least 4 hours to the action of a hydrogen ion concentration at least 10 times as great as that to which it is subjected during said fermentation, adding fermentable sugar to sustain the vitality of said yeast during said acid treatment and mixing said yeast with further quantities of sugar-containing wort.

5. A continuous cyclic process for the production of alcohol by fermentation by means of yeast comprising repeatedly carrying out the cycle of operations which consists of subjecting a sugar-containing wort to the action of yeast, allowing the fermentation of said wort to proceed to completion, separating said yeast from the fermented wort thus produced, subjecting said yeast, for at least 4 hours, simultaneously to the action of a hydrogen ion concentration at least 10 times as great as that to which it is subjected during the fermentation, and to the action of carbon dioxide under super atmospheric pressure, and mixing said yeast with a further quantity of sugar-containing wort.

6. A continuous cyclic process of production of alcohol by fermentation by means of yeast, comprising repeatedly carrying out the cycle of operations which consists of subjecting a molasses wort to the action of yeast, allowing the fermentation of said wort to proceed to completion, separating said yeast from the fermented wort thus formed, diluting said separated yeast with from 4 to 5 times its volume of water, subjecting said yeast thus diluted, for 15 hours simultaneously to the action of an amount of mineral acid sufficient to give a pH value of 3, and to the action of carbon dioxide and mixing said yeast with a further supply of molasses wort.

7. A continuous cyclic process for the production of alcohol by fermentation by means of yeast, comprising repeatedly carrying out the cycle of operations which consists of subjecting a beet wort to the action of yeast, allowing fermentation of said wort to proceed to completion, separating said yeast from the fermented wort thus formed, diluting said yeast with from 4 to 5 times its own volume of water and then subjecting said yeast, for a period of 4 hours, to the simultaneous action of an amount of acid sufficient to give a pH value of 2, and of carbon dioxide, and mixing said yeast with a further quantity of sugar-containing wort.

FIRMIN BOINOT.